United States Patent
Chai et al.

(10) Patent No.: US 9,813,102 B2
(45) Date of Patent: Nov. 7, 2017

(54) DISPLAY PANEL WITH TRANSPARENT CONDUCTOR BASED ISOLATOR AND METHOD FOR IMPROVED WIRELESS COMMUNICATIONS

(71) Applicant: Intel Corporation, Santa Clara, CA (US)

(72) Inventors: Mei Chai, Portland, OR (US); Helen Kankan Pan, Portland, OR (US); Bryce Horine, Aloha, OR (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 14/570,903

(22) Filed: Dec. 15, 2014

(65) Prior Publication Data
US 2016/0173161 A1    Jun. 16, 2016

(51) Int. Cl.
| | |
|---|---|
| *H04B 1/40* | (2015.01) |
| *G06F 3/147* | (2006.01) |
| *H01Q 1/24* | (2006.01) |
| *H01Q 1/52* | (2006.01) |
| *H01Q 15/00* | (2006.01) |
| *H01Q 21/28* | (2006.01) |

(52) U.S. Cl.
CPC .............. *H04B 1/40* (2013.01); *G06F 3/147* (2013.01); *H01Q 1/243* (2013.01); *H01Q 1/521* (2013.01); *H01Q 15/006* (2013.01); *H01Q 21/28* (2013.01)

(58) Field of Classification Search
CPC .................................. H04B 1/40; G06F 3/147
See application file for complete search history.

(56) References Cited

U.S. PATENT DOCUMENTS

| | | | |
|---|---|---|---|
| 6,507,150 B1 * | 1/2003 | Lin ...................... | H01J 11/12 313/582 |
| 2010/0177076 A1 * | 7/2010 | Essinger .............. | G09G 3/3433 345/207 |
| 2014/0340279 A1 | 11/2014 | Bayram et al. | |

FOREIGN PATENT DOCUMENTS

| | | |
|---|---|---|
| CN | 105703795 A | 6/2016 |
| EP | 2991162 A1 | 3/2016 |
| WO | WO-2014194575 A1 | 12/2014 |

OTHER PUBLICATIONS

"European Application Serial No. 15194401.4, Extended European Search Report dated May 23, 2016", 10 pgs.
Ucar M, H B, "Switchable Split-Ring Frequency Selective Surfaces", Progress In Electromagnetics Research B, Electromagnetics Academy, Us.vo l. 6, (Jan. 1, 2008), 65-79.

* cited by examiner

*Primary Examiner* — Errol Fernandes
(74) *Attorney, Agent, or Firm* — Schwegman Lundberg & Woessner, P.A.

(57) ABSTRACT

A communication device includes at least one radio that comprises signal processing circuitry, and at least one antenna coupled to the signal processing circuitry to send and receive radio signals. A component of the communication device requires user visibility and includes an isolator for isolating the at least one antenna, the isolator comprising at least one film that includes a transparent conductor. The component that requires user visibility may be a display screen or part of the chassis of a transparent communication device. The transparent conductor comprises a transparent conducting oxide such as indium tin oxide, indium tin oxide ink, graphite material, carbon nanotubes, or a conductive polymer.

10 Claims, 5 Drawing Sheets

DISPLAY PANEL WITH TRANSPARENT CONDUCTOR BASED ISOLATOR AND METHOD FOR IMPROVED WIRELESS COMMUNICATIONS

TECHNICAL FIELD

Some embodiments relate to wireless communications. Some embodiments relate to Wi-Fi networks and networks operating in accordance with one of the IEEE 802.11 standards. Some embodiments relate to uplink multi-user MIMO (UL MU-MIMO) communications. Some embodiments relate to display panels. Embodiments described herein relate generally to improved antenna isolation using thin films of transparent conducting oxides on the display of a communication platform.

BACKGROUND

The conventional approach for platform antenna isolation is to place the antenna component at essentially the farthest distance from the other components of the platform in order to obtain minimum undesired antenna coupling. This is limited by a compact platform with limited space. Currently there is a need for antenna isolation in multi-radio platforms, particularly those that employ multiple input-multiple outputs (MIMO).

DESCRIPTION OF EMBODIMENTS

Figure 1:
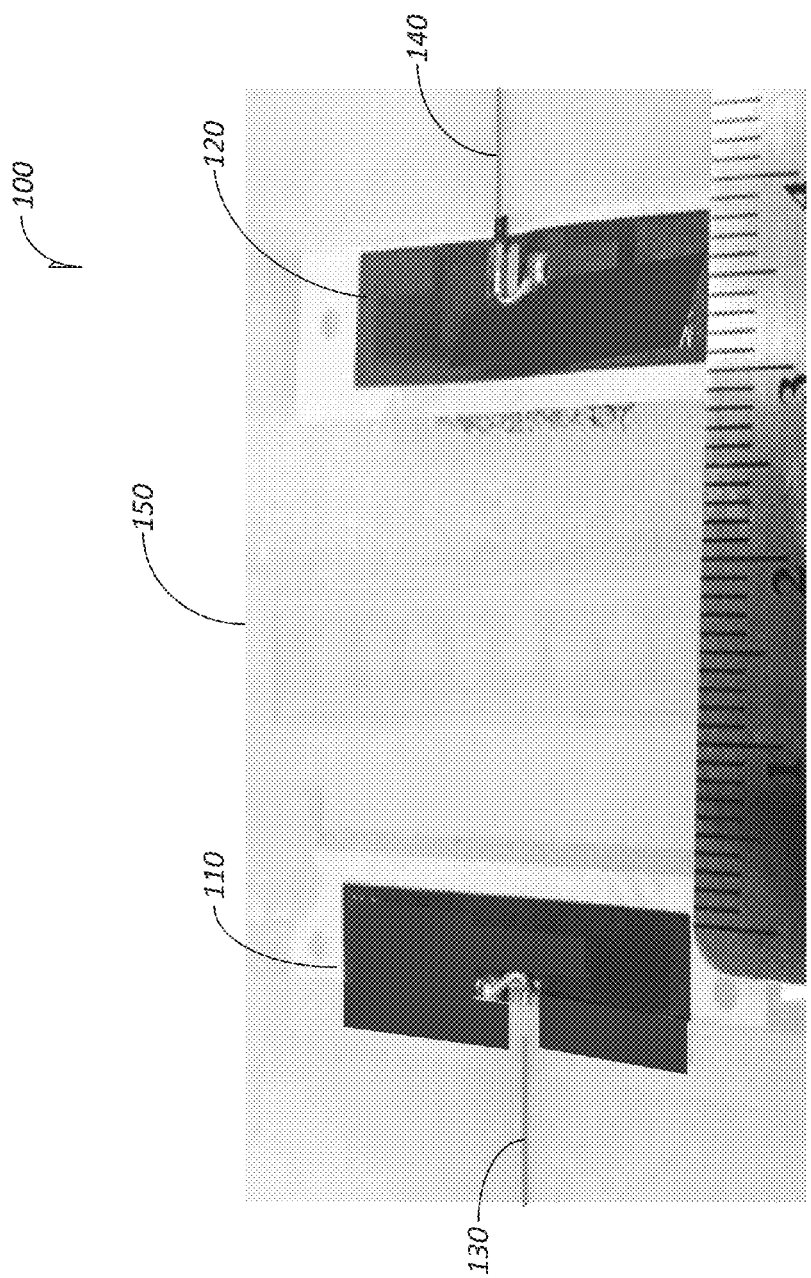
FIG. 1 illustrates an isolation testing setup for an isolation study useful for an embodiment.

The conventional approach for platform antenna isolation is to place the antenna component(s) at essentially the farthest distance from the other components of the platform to obtain maximum isolation for an antenna, and minimum coupling between and among a plurality of antennas. This is limited by a compact platform with limited space. Orthogonal antenna polarization is also implemented in mobile platforms to increase isolation. But such antenna polarization is limited to 3 in 3-dimensional space. In a realistic mobile platform implementation, the realistic antenna orthogonally is 2. As MIMO increases to greater than 2, invisible transparent conductor isolation addresses these challenges to further improve isolation without number limitation.

Antenna isolation can be enhanced by using an essentially invisible transparent conductor design in the large display panel of a communication platform, or device, to improve the isolation for the entire system. Transparent conductors may include transparent conducting oxides (TCO) such as indium tin oxide (ITO), and other compounds, that have marginal impact on the visibility of a display.

In the past, wireless components were not placed on the display of a device such as, in an embodiment, a mobile phone. The disclosed innovation places large areas of transparent material on the display. Most of the transparent material comprises transparent conductors that are based on, in one embodiment, ITO. Other similar compounds may be used. Antenna and system isolation is enhanced using transparent conductor based isolation for this large display panel to improve the isolations for the entire system. Further, this new isolator design is not limited to the display only, but can be applied to any other platform component which has visibility requirements, like the back of the communication platform chassis. This requirement may be for, in various embodiments, transparent communication devices, flexible devices, and the like, which may require transparent or see-through chassis components.

As mentioned above, the disclosed antenna integration with display panels improves the isolation for the entire system in which the display is a component and boosts MIMO antenna performance. Further, this transparent isolator design utilizes previously unusable display panel area and optimizes mobile platform performance. This allows more radios to be integrated in a mobile platform with minimum crosstalk than could be integrated into the mobile platform without the isolator, or the same number of radios integrated into a smaller mobile platform with the isolator. In other words, including the isolator in a mobile platform allows an increased density, or number, of radios in the mobile platform.

In one embodiment an indium tin oxide (ITO) based electromagnetic band gap (EBG) structure may be designed at 2.4 GHz and used as the isolator film. In other embodiments structures other than EBG may be used provided that transparent conductor based structures which comprise, in various embodiments, ITO, ITO ink, graphite, carbon nanotubes, conductive polymers, and other oxide materials are used.

FIG. 1 illustrates an isolation testing setup for an isolation study. In one embodiment an ITO based EBG structure may be designed at 2.4 GHz. Various scenarios or designs for the platform antenna isolation improvement technique using a transparent EBG design have been tested, and isolation improvement has been measured, in the laboratory. As seen in FIG. 1 a testing setup 100 tests the S12 of two antennas. S-parameters describe the input-output relationship between ports (or terminals) in an electrical system. If there are two ports, Port 1 and Port 2, then S12 represents the power transferred from Port 2 to Port 1. S21, on the other hand represents the power transferred from Port 1 to Port 2. Therefore, the testing currently described measures the undesired power transferred from one antenna to the other antenna.

Continuing with FIG. 1, test setup 100 comprises two antennas, 110 and 120. The antennas are placed on a glass surface 150 that includes a TCO film, in this case ITO using an EBG structure. Wires 130 and 140 are connected respectively to antennas 110 and 120 for an isolation study that measures the isolation between the two antennas. Invisible touch techniques that use beams of light to turn a flat space into a touch screen may be used in this testing. The isolator may be coexistent with the touch sensor component(s). The isolation improvement between two WiFi antennas has be measured for various test cases such as one and three EBG ITO based isolators, and three transparent conductors, such as transparent conductors on polyethylene terephthalate (PET) from Asahi Glass Co., Ltd. (AGC). Gains of approximately 6 dB to 10 dB for different testing setups have been measured.

Figure 2:
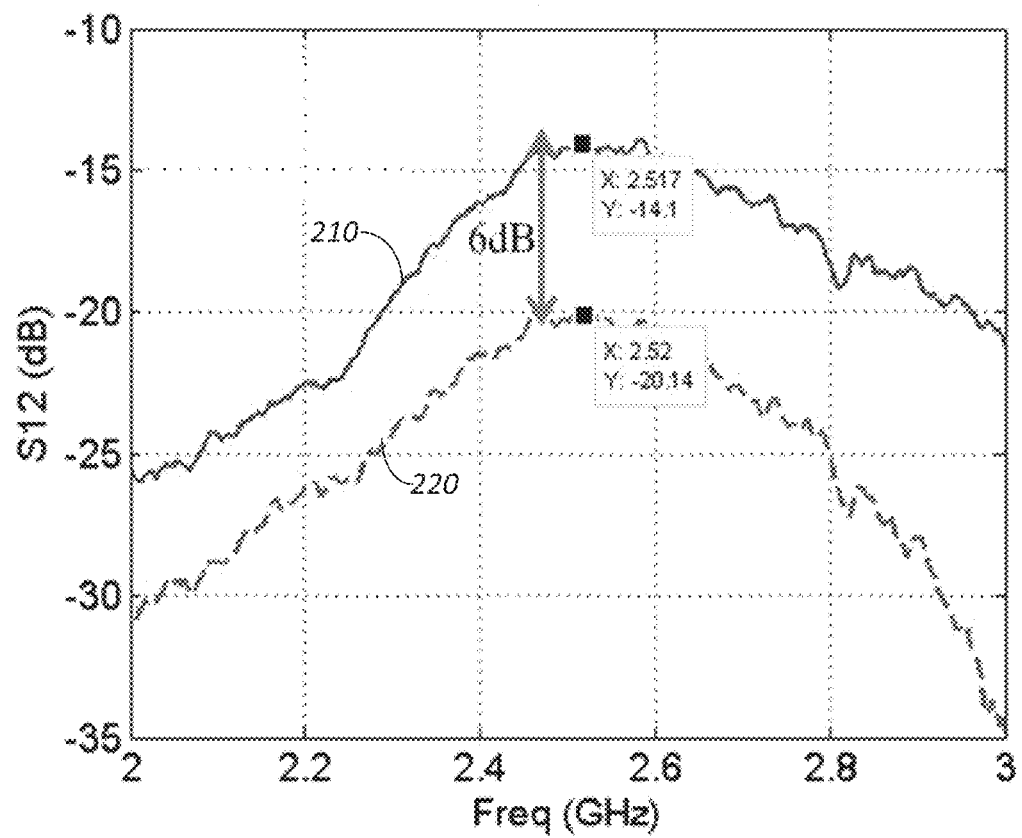
FIG. 2 illustrates the measured S12 of two antennas at WiFi™ frequencies using an embodiment.

FIG. 2 illustrates the measured S12 of the two antennas 110, 120 of FIG. 1 at WiFi frequencies for two cases. Curve 210 represents S12 without isolation on the display 150 of FIG. 1. Curve 220 represents S12 with an ITO film comprising an EBG structure on the display 150. The measured isolation advantage using ITO isolation is 6 dB as can be seen by the indicated vertical distance between the two curves at or near frequencies of 2.4 GHz to 2.6 GHz. The frequencies and the S12 value are noted at coordinates X and Y, respectively, in FIG. 2. Other experimental measurements using the same or a similar testing setup can be applied between any general antennas. Performance gains are not limited to the WiFi band only but other frequency bands suitable for wireless communication may be used.

Figure 3:
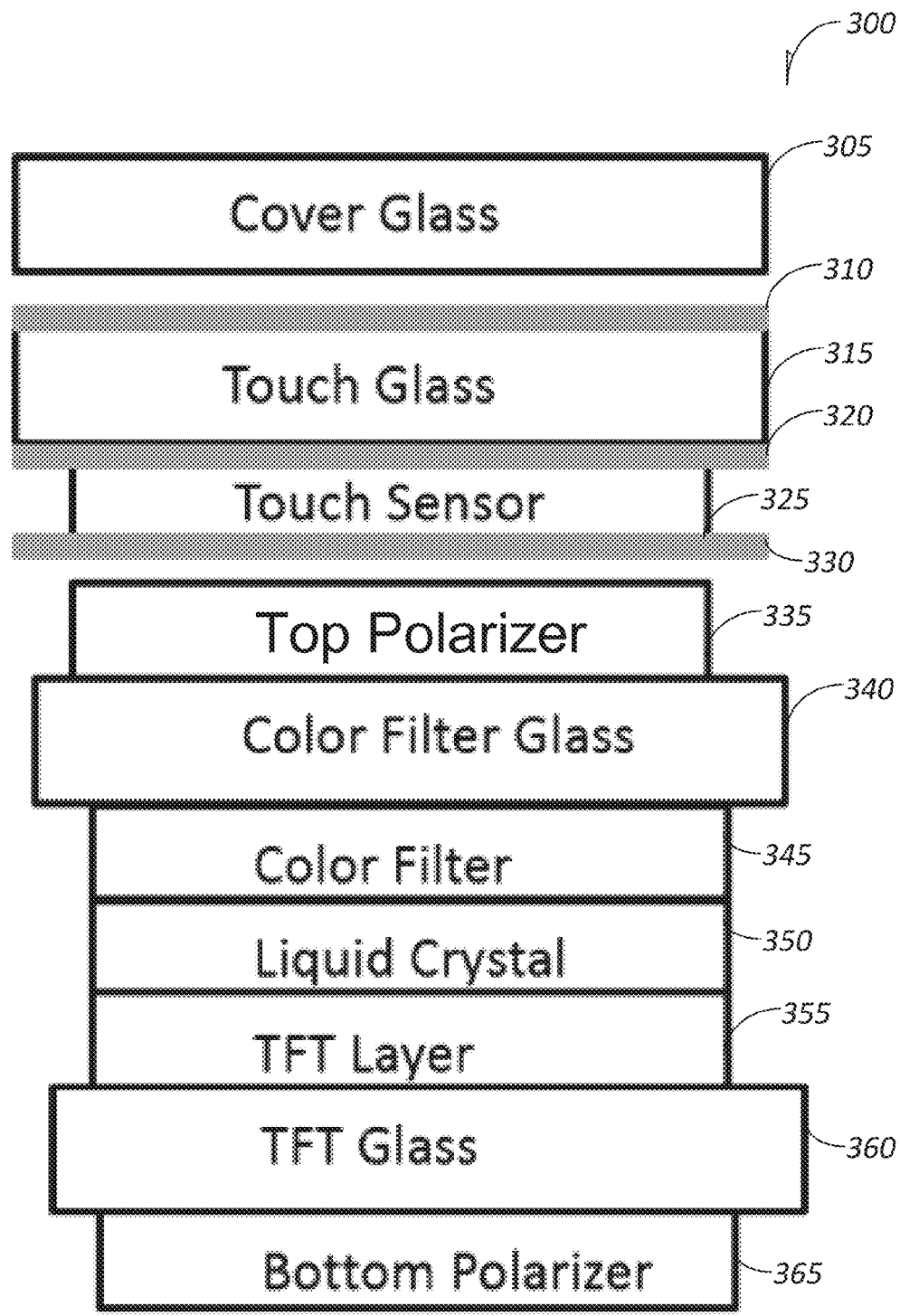
FIG. 3 illustrates a side view a stack of components that make up a display according to an embodiment.

FIG. 3 illustrates a side view a stack of components that make up a display according to an embodiment. The components, in exaggerated dimension, comprise a stack of components that make up a display such as, in one embodiment, a flexible flat panel display for a mobile phone. The stack 300 comprises cover glass 305, touch glass 315, touch sensor 325, top polarizer 335, color filter glass 345, liquid crystal 350, thin film transistor (TFT) layer 355, TFT glass 360 and bottom polarizer 365. This is only one of a number of embodiments of a display that may be used for isolation. A layer of isolator, such as ITO, may be placed at any of three places in the stack. In an embodiment the ITO layer 310 may be on the top of touch glass 315. In an embodiment a layer of isolator 320 may be part of the touch sensor 325. In an embodiment layer of isolator 330 may be at the bottom of touch sensor 325. And isolator designs with more than one layer of transparent conductor can be placed in these three layers 310, 320, and 330. Three more possible options are to place the TCO film above the color filter glass 340, below color filter glass 340, and around TFT layer 355. A 3D isolator may be placed between one or more of the layers as appropriate or necessary.

One or more embodiments can also be used to create isolation between multiple wireless subcomponents. Antennas may be the primary example for isolation, but there are other subcomponents that could be integrated into or be separate from the antenna, and these subcomponents may benefit from the isolation described herein. These could include a matching network as well as other wireless communication protocols such as, without limitation, BLUETOOTH™ (BT), ultra-wideband (UWB) and near field communication (NFC). One or more embodiment could be used as a layer to layer isolation or as a structure between layers (2D and 3D). The material can be indium tin oxide (ITO) but also any transparent conductor, including graphene and other transparent conductors. In addition, the term "transparent" can mean not perceived, invisible, or visible with an optical translucence of greater than eighty percent (80%), such that other materials or structures may be included within the term "transparent."

Figure 4:
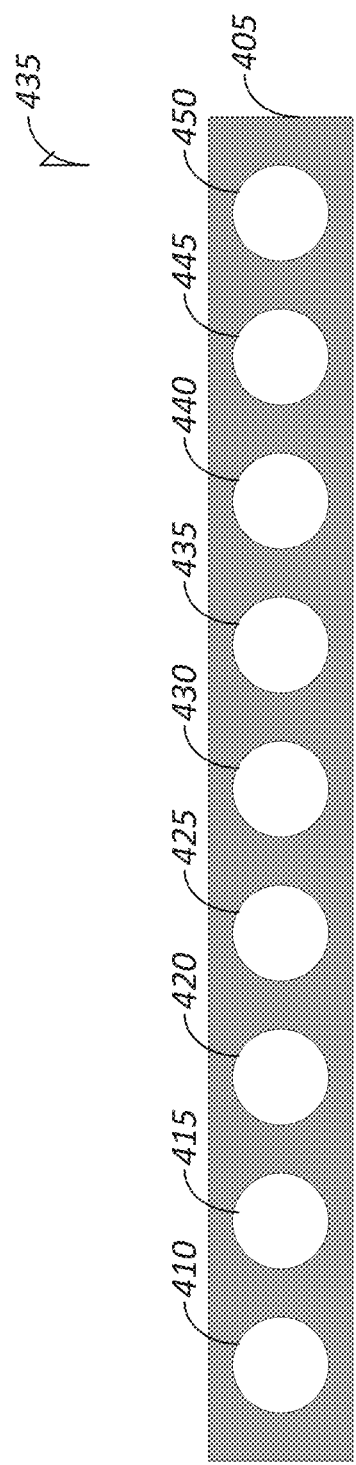
FIG. 4 illustrates an electromagnetic band gap (EBG) structure comprising a transparent conduction oxide according to an embodiment.

FIG. 4 illustrates an EBG structure comprising a transparent conducting oxide according to an embodiment. Such an EBG structure may be used as the ITO layer. The EBG structure 405 comprises ITO. Holes 410, 415, . . . , 450 may comprise merely air, such that the component below it in FIG. 3 may be seen. In one embodiment, the radius of the holes is substantially 2 mm, and the distance between centers of adjacent holes is substantially 5 mm.

Figure 5:
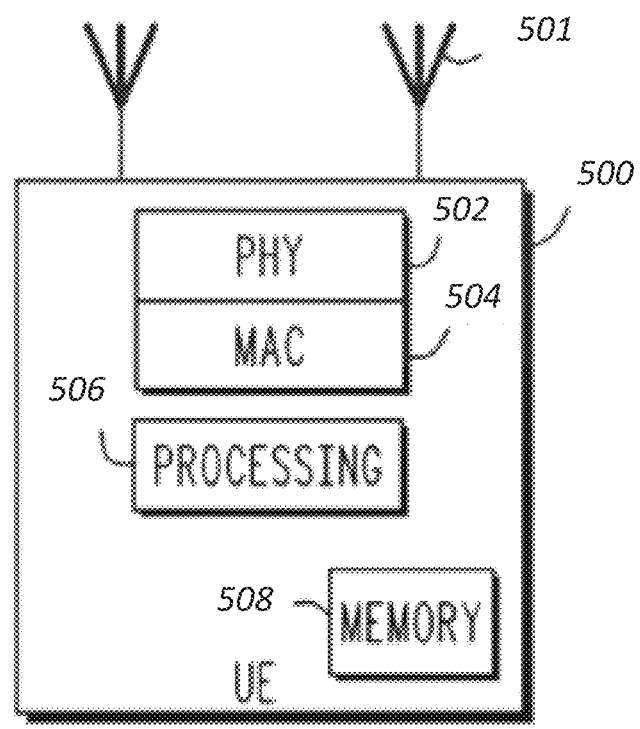
FIG. 5 illustrates a functional block diagram of user equipment (UE) in accordance with some embodiments.

FIG. 5 illustrates a functional block diagram of a communication platform with which the antenna isolation described herein may be used, in accordance with some embodiments. In some embodiments the communication platform may be UE configured to operation in a mobile communication network, such as a 3GPP LTE network, while in other embodiments, the communication platform may be a communication station (STA) configured to operation in a Wi-Fi network. The embodiments are not limited to 3GPP LTE networks, or Wi-Fi networks. In accordance with some embodiments, the open systems interconnection media access control (MAC) circuitry 504 may be arranged to contend for a wireless medium configure frames or packets for communicating over the wireless medium and the physical layer (PHY) circuitry 502 may be arranged to transmit and receive signals. The PHY 502 may include circuitry for modulation/demodulation, upconversion/downconversion, filtering, amplification, etc. In some embodiments, the processing circuitry 506 of the UE 500 may include one or more processors. In some embodiments, two or more antennas may be coupled to the physical layer circuitry arranged for sending and receiving signals. The memory 508 may be store information for configuring the processing circuitry 506 to perform operations for configuring and transmitting UE frames and performing the various operations described herein.

In some embodiments, the communication platform 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the platform 500 may include one or more of a keyboard, a display, a non-volatile memory port, multiple antennas, a graphics processor, an application processor, speakers, and other mobile device elements. The display may be a liquid crystal display (LCD) screen including a touch screen.

The one or more antennas 501 utilized by the communication platform 500 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the communication platform 500 may be configured to receive orthogonal frequency division multiplexing (OFDM) communication signals over a multicarrier communication channel in accordance with an orthogonal frequency division multiple access (OFDMA) communication technique. The OFDM signals may comprise a plurality of orthogonal subcarriers. In some broadband multicarrier embodiments, Evolved Node Bs (eNBs) may be s may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the platform 500 and the eNBs may be configured to communicate in accordance with an OFDMA technique.

Although the communication platform 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

EXAMPLES AND ADDITIONAL NOTES

In Example 1, a display panel can include plurality of display panel components, and an antenna isolator that comprises at least one film that includes a transparent conductor in contact with at least one of the display panel components.

In Example 2, the at least one film of Example 1 can optionally include a plurality of films that include a transparent conductor.

In Example 3, the plurality of films that include a transparent conductor of any one or more of Examples 1-2 can optionally include at least two films each of which includes a different transparent conductor.

In Example 4, any one or more of Examples 1-3 can optionally comprise an electromagnetic bandgap structure that comprises the transparent conductor.

In Example 5, the transparent conductor of any one or more of Examples 1-4 can optionally be or comprise a transparent conducting oxide.

In Example 6, the transparent conductor of any one or more of Examples 1-5 can optionally be or comprise indium tin oxide.

In Example 7, transparent conductor of any one or more of Examples 1-6 can optionally be or comprise one of a graphite material, carbon nanotubes, a conductive polymer, or ITO ink.

In Example 8, the display panel of any one or more of Examples 1-7 can optionally be or comprise a touch screen.

In Example 9, the display panel of any one or more of Examples 1-8 can optionally be coupled to at least one antenna for providing antenna isolation that allows an increased number of radios to be integrated in a wireless communication device.

In Example 10, the display panel of any one or more of Examples 1-9, the at least one antenna can optionally be or comprise a plurality of antennas configured for one of multiple input multiple output (MIMO) operation, WiFi operation, or Long Term Evolution (LTE) operation.

In Example 11 User Equipment (UE) can optionally comprise at least one radio comprising signal processing circuitry, at least one antenna coupled to the signal processing circuitry to send and receive radio signals, and a UE component that requires visibility to a user, the component including an isolator comprising at least one film that comprises a transparent conductor, the isolator for isolating the at least one antenna.

In Example 12, the at least one antenna of Example 11 can optionally be or comprise a plurality of antennas and the UE can optionally be configured to operate with a 3GPP LTE cellular network.

In Example 13, the at least one antenna of any one or more of Examples 11-12 can optionally be or comprise a plurality of antennas and the UE can optionally be or comprise a communication station (STA) configured to operate in a WiFi network.

In Example 14, the UE of any one or more of Examples 11-13 can optionally comprise memory for storing information for configuring the processing circuitry to perform configuring operations.

In Example 15, the UE component of any one or more of Examples 11-14 can optionally be or comprise a display panel.

In Example 16, the display panel of any one or more of Examples 11-15 can be or comprise a touch screen.

In Example 17, the UE component of any one or more of Examples 11-16 can optionally be or comprise at least part of the chassis of one of a transparent communication device, a see-through communication device, or a flexible communication device.

In Example 18, the isolator of one or more of Examples 11-17 can optionally allow an increased number of radios integrated in the UE.

In Example 19, the at least one film of the Examples 11-18 can optionally be or comprise a plurality of films that comprise a transparent conductor.

In Example 20, the plurality of films of any one or more of Examples 11-19 can optionally be or comprise a transparent conductor comprising at least two films each including a different transparent conductor.

In Example 21, the electromagnetic bandgap structure of any one or more of Examples 11-20 can optionally be or comprise the transparent conductor.

In Example 22, the transparent conductor of any one or more of Examples 11-21 can optionally be or comprise a transparent conducting oxide.

In Example 23, the transparent conductor of any one or more of Examples 11-22 can optionally be or comprise indium tin oxide.

In Example 24, the transparent conductor of any one or more of Examples 11-23 can optionally be or comprise one of a graphite material, carbon nanotubes, a conductive polymer, or ITO ink.

In Example 25, a method of operating User Equipment (UE) that can be configured to comprise at least one radio comprising signal processing circuitry, a plurality of antennas coupled to the signal processing circuitry to send and receive radio signals, and a UE component that requires visibility to a user, the component including thereon an isolator comprising at least one film that comprises a transparent conductor, the isolator for isolating the plurality of antennas can optionally be or comprise comprising sending first radio signals from the at least one radio via at least one of the plurality of antennas to at least one Evolved Node B (eNB) and receiving second radio signals from at least one eNB by one or more of the plurality of antennas.

In Example 26, the at least one film of Example 25 can optionally be or comprise a transparent conductor and the UE can optionally be configured to operate with a 3GPP LTE cellular network.

In Example 27, the at least one film of any one or more of Examples 25-26 can optionally be or comprise a transparent conductor, and the UE can optionally be or comprise a communication station (STA) configured to operate in a Wi-Fi network.

In Example 28, the transparent conductor of any one or more of Examples 25-27 can optionally be or comprise one of indium tin oxide, graphite material, carbon nanotubes, a conductive polymer, or ITO ink.

In Example 29, the UE component of any one or more of Examples 25-28 can optionally be or comprise a display panel.

In Example 30, the display panel of any one or more of Examples 25-29 can optionally be or comprise a touch screen.

Example 31 can comprise, or can optionally be combined with any portion or combination of any portions of any one or more of Examples 1 through 30 to include subject matter that can comprise means for performing any one or more of the functions of Examples 1 through 30, or a machine-readable medium including instructions that, when performed by a machine, cause the machine to perform any one or more of the functions of Examples 1 through 30.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment

What is claimed is:

1. A display panel comprising:
   a plurality of display panel components; and
   an electrical isolator comprising at least one film that includes a transparent conductor that is in contact with at least one of the display panel components, wherein the electrical isolator provides electrical isolation between two antennas integrated with the display panel.

2. The display panel of claim 1 wherein the at least one film comprises a plurality of films that each include a transparent conductor.

3. The display panel of claim 2 wherein the plurality of films that include a transparent conductor comprising at least two films each of which includes a different transparent conductor.

4. The display panel of claim 1 wherein an electromagnetic bandgap structure comprises the transparent conductor.

5. The display panel of claim 1 wherein the transparent conductor is a transparent conducting oxide.

6. The display panel of claim 1 wherein the transparent conductor is indium tin oxide.

7. The display panel of claim 1 wherein the transparent conductor is one of a graphite material, carbon nanotubes, a conductive polymer, or indium tin oxide (ITO) ink.

8. The display panel of claim 1 wherein the display panel comprises a touch screen.

9. The display panel of claim 1 coupled to at least one antenna for providing antenna isolation that allows an increased number of radios to be integrated in a wireless communication device.

10. The display panel of claim 9 wherein the at least one antenna comprises a plurality of antennas configured for one of multiple input multiple output (MUM) operation, Wi-Fi operation, or Long Term Evolution (LTE) operation.

* * * * *